United States Patent [19]
Sword et al.

[11] 3,986,089
[45] Oct. 12, 1976

[54] CONTROL APPARATUS FOR ELECTRIC MOTORS

[75] Inventors: Geoffrey Sword; John Leslie Lawrence; Stephen Richard Raggett, all of Fareham; Bernard Blakemore, London, all of England

[73] Assignee: Colourvision Associates, London, England

[22] Filed: Feb. 8, 1974

[21] Appl. No.: 440,701

[30] Foreign Application Priority Data
Feb. 9, 1973  United Kingdom............... 6426/73

[52] U.S. Cl................................ 318/326; 318/313; 318/318
[51] Int. Cl.[2].......................................... H02P 5/16
[58] Field of Search .......... 318/311, 313, 314, 326, 318/318

[56] References Cited
UNITED STATES PATENTS

| | | | |
|---|---|---|---|
| 3,268,788 | 8/1966 | Branco............................ | 318/313 X |
| 3,421,065 | 1/1969 | Stabile............................ | 318/311 X |
| 3,510,742 | 5/1970 | Pooley............................ | 318/313 |
| 3,577,056 | 5/1971 | Tsujikawa....................... | 318/318 X |
| 3,800,196 | 3/1974 | Zimmermann................... | 318/313 X |
| 3,821,604 | 6/1974 | Walraven....................... | 318/313 X |

Primary Examiner—B. Dobeck
Attorney, Agent, or Firm—Robert F. O'Connell

[57] ABSTRACT

A control for an electric motor for driving the intermittent film drive mechanism in a flying-spot film scanner. The speed and phase of the motor output shaft is sensed and compared with the field-blanking pulses of a television system to bring the speed and phase into a desired relation with the field-blanking pulse rate and the field-blanking pulse time of occurrence. The rotation of the motor output shaft generates pulses at an adjustable rate and phase which can be compared in a comparator with the rate and phase of the field-blanking pulses.

3 Claims, 7 Drawing Figures

CONTROL APPARATUS FOR ELECTRIC MOTORS

BACKGROUND OF THE INVENTION

This invention relates to control apparatus for electrical motors, and particularly to control apparatus for an electric motor for driving an intermittent drive mechanism in a flying spot television scanner apparatus.

A flying spot television scanner apparatus typically comprises a film transport mechanism including a driven take-up spool and a driven intermittent drive mechanism. Electric motors are provided for driving the take-up spool and the intermittent drive mechanism, and these motors are so controlled as to ensure that a film passes through a film gate in the transport mechanism at a rate of film frames per second which preserves the illusion of natural motion on the film and also enables each frame of the film to be scanned by two or more television scanning fields while ensuring that pull-down of the film between successive frames presented for scanning in the gate occurs only during a field blanking pulse of the television scanning. The scanning is accomplished by a point of light carrying out a television field scan on the picture area of a film frame in the gate. This point of light is produced by a cathode ray tube combined in the flying spot scanner apparatus with an optical system arranged to project an image of a raster area of the screen of the cathode ray tube on to the picture area in the gate. The cathode ray tube is coupled to television scanning and blanking circuits which in operation produce a television raster on the raster area of the tube screen.

In television in the United States, there are sixty fields per second and correspondingly sixty field blanking pulses per second. In the United Kingdom, there are fifty fields per second and fifty field blanking pulses per second.

The known flying spot television scanner apparatuses are restricted to scanning films whose intended frame rate is twenty-four frames per second. However, films intended to be shown at eighteen frames per second are produced in great numbers, and it is accordingly an object of the present invention to provide control apparatus for an electric motor which can be incorporated in a flying spot television scanner apparatus for twenty-four frame per second film or eighteen frame per second film.

SUMMARY OF THE INVENTION

According to the present invention there is provided control apparatus for an electric motor having a rotor, the apparatus including a power amplifier connected to energise the motor, means for sensing the rate of rotation of the rotor in operation and generating an analog signal representative of the said rate, the power amplifier being adapted to receive as input thereto a reference input signal, the said analog signal, and a further input signal, and a comparator. The said means is adapted to generate a tachometric periodic signal of which the frequency is proportional to the said rate, and to supply the tachometric periodic signal to the comparator. A reference periodic signal is supplied to the comparator during operation and the comparator is such as to compare each cycle of the tachometric periodic signal with a respective cycle of the reference periodic signal and to generate in response thereto in each cycle of the reference periodic signal the said further input signal. The said further input signal is representative of the magnitude and sense of departure of phase difference between the tachometric periodic signal and the reference periodic signal from a predetermined value and such as to bring the rate of rotation of the rotor into a predetermined relationship with the frequency of the reference periodic signal.

The said means preferably includes an arrangement for generating electrical pulses at a rate proportional to the rate of rotation of the rotor, an integrator adapted to integrate the electric pulses so as to generate therefrom the said analog signal, and divider circuitry arranged to count the electric pulses and generate therefrom the said tachometric periodic signal.

The said comparator may comprise a ramp generator arranged to generate one ramp in each cycle of the reference periodic signal and be such as to sample each ramp at a phase corresponding to a selected phase of the tachometric periodic signal.

One example of a preferred embodiment of the invention for use in a film transport of a flying spot scanner apparatus wherein the said motor is coupled to a claw mechanism for drawing film through an optical gate. In this embodiment further means are provided for generating a reference pulse indicative of the time at which a frame of the film is moved through the optical gate by the claw mechanism, and this pulse is used to bring the tachometric periodic signal into a relationship with the action of the claw mechanism such that the movement of a frame through the optical gate always coincides with a field blanking pulse of the flying spot scanner tube, the field blanking pulses being supplied to the said comparator as the said reference periodic signal.

The preferred embodiment of the present invention will now be described with reference to the accompanying drawings.

DETAILED DESCRIPTION OF THE PREFERRED EMBODIMENT

Figure 7:
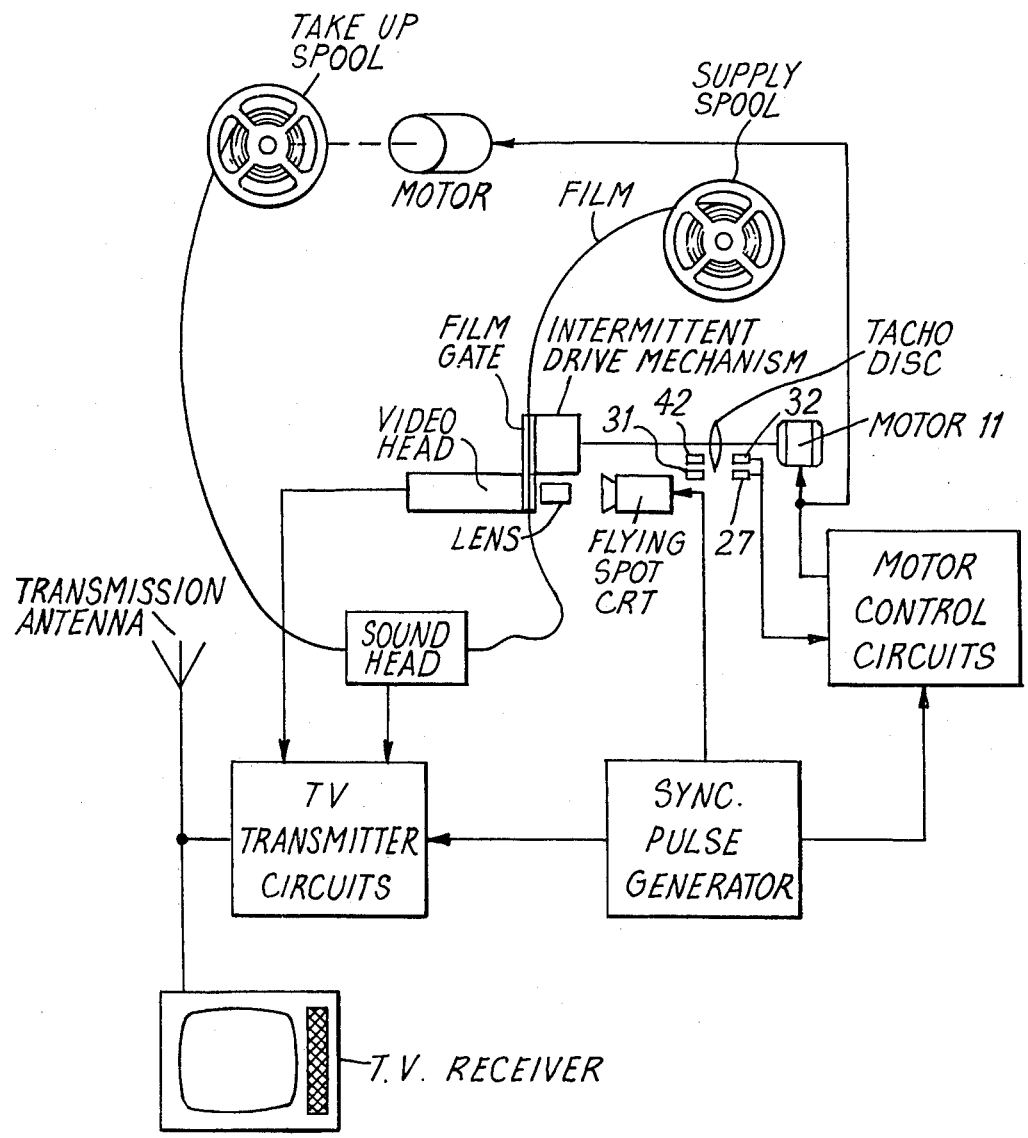
FIG. 7 is a block diagram of the flying spot television scanner apparatus incorporating the invention of FIGS. 1 to 6.

A novel flying spot television scanner apparatus embodying the present invention will now be described with reference to FIG. 7 of the accompanying drawings. In FIG. 7 there is shown a television transmitter apparatus coupled by a transmission line such as a coaxial cable to a transmission antenna and a television receiver apparatus. Where the transmitter apparatus is intended to broadcast a programme via the antenna, the coupled receiver may be a transmission monitoring receiver. Alternatively, the apparatus of FIG. 7 may be intended primarily as a cable television system, the transmission antenna being disconnected or replaced by a receiving antenna for the individual receiver and the receiving antenna may be disconnected when the receiver is being supplied by the transmitter apparatus, or may remain connected if there is no risk of interference from signals in the channel of frequencies transmitted by the transmitter apparatus.

The transmitter apparatus includes a flying spot scanner with a film transport mechanism including a driven take-up spool and a driven intermittent drive mechanism. A first d.c. electric motor controlled by the motor control circuits of the invention is coupled to drive the take-up spool, and a second d.c. electric motor 11 controlled by the motor control circuits of the invention is coupled to drive the intermittent drive mechanism. The film transport mechanism also includes a film gate through which film from a supply spool is drawn by the intermittent drive mechanism to pass before a video head and through a sound head before winding on to the take-up spool. Other, conventional mechanical details of the film transport will be obvious to those skilled in the art and therefore will not be described herein. The intermittent drive mechanism may be as described and claimed in the co-pendng application entitled "Mechanisms for Transporting Perforated Strip Material" by John T. Taylor, Anthony J. Halliday, Jonathan G. C. Angel and Bernard Blakemore, filed on the same day as the present application.

The scanner includes a flying spot cathode ray tube controlled by a synchronizing pulse generator. Such arrangements are described in The Focal Encyclopedia of Film & Television Techniques, published in 1969 by The Focal Press, London and New York, at pages 817 to 845. Synchronizing pulse generators are described in the aforesaid focal Encyclopedia at page 811.

In operation, a television field raster is produced on the screen of the cathode ray tube, and the light from the scanning spot constituting this raster is focussed by a lens or lens system to form an image of the raster on a picture area of a frame of the film in the film gate. The video head may be a conventional monochrome television video head incorporating a single photomultiplier and suitable elements for focussing light from the illuminated picture on to the sensitive area of the photomultiplier thereby producing in operation a video signal which is supplied by the video head to the composite video signal forming portion of television transmitter circuits, the output of the synchronizing pulse generator likewise being supplied thereto in known manner for the production in the transmitter circuits of a composite video signal. If the transmitter apparatus is intended to transmit colour television signals, and the colour system is the NTSC system, the transmitter circuits and synchronizing pulse generator may be as described in Principles of Color Television by The Hazeltine Laboratories Staff, published in 1956 by John Wiley & Sons, Inc., Library of Congress Catalogue Card Number 56-8693. Where the colour system is the PAL system, the transmitter circuits and synchronizing pulse generator may be as described in PAL Colour Television by G. Boris Townsend, published by the Syndics of the Cambridge University Press, London and New York, in 1970, Library of Congress Catalogue Card Number 76-96102. Further detailed circuitry can be found in Colour Television, Volumes 1 and 2, by P. S. Carnt and G. B. Townsend, published 1961 and 1969 respectively by Iliffe Books Ltd., London, and Principles of PAL Colour Television and Related Systems, by H. V. Sims, published in 1969 by Iliffe Books, Butterworth & Co. (Publishers) Ltd., London and Toronto. The latter contains an Appendix I at pages 139 to 143 which described in outline a flying spot colour television transparency scanner for film slides.

Figure 1:
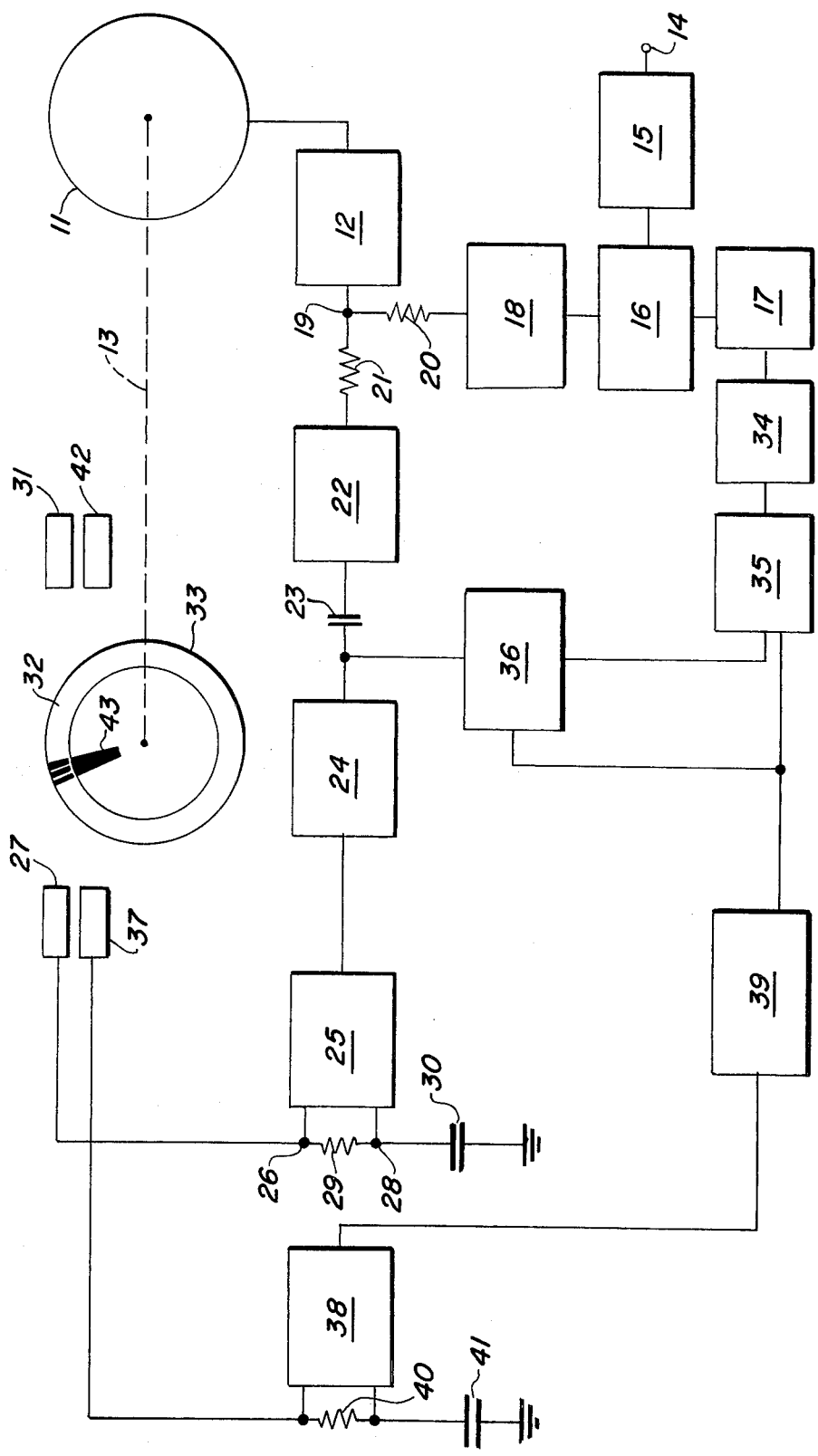
FIG. 1 is a block diagram of control apparatus for an electric motor of a film transport apparatus embodying the present invention.

The motor control circuits generate a control output signal for controlling the two electric motors in response to the field blanking pulses generated by the synchronizing pulse generator and two input signals indicative respectively of the rate and phase of operation of the intermittent drive mechanism, these two input signals being generated by a rotation sensing arrangement including a tachometer disc, two photocells 27 and 37 and two light sources 31 and 42 as will be described hereinafter in more detail with reference to FIG. 1. These two input signals together with the field blanking pulses are utilised in the motor control circuits of the invention to control the motor 11 so that the film is drawn through the gate at a rate commensurate with the field frequency and is moved only during field blanking intervals.

In FIG. 1 of the drawings there is shown an embodiment of the invention used in the flying spot film scanner of FIG. 7. The d.c. motor 11 is powered by a power amplifier 12 of the output from which is so controlled as to ensure that the output shaft 13 of the motor 11 rotates at a rate having a predetermined relationship to the field frequency of a flying spot scanner tube. In the present example the number of revolutions of the shaft 13 can be set to be one third or one half the number of fields per second of the scanner tube. To achieve this, the field blanking pulses generated in the synchronizing pulse generator are supplied to an input terminal 14 of a ramp generator 15 which generates one ramp per field blanking pulse, the rise time of the ramp corresponding to the duration of one complete field, and the fly back of the ramp corresponding to the blanking of the field flyback. Each ramp thus generated is supplied to a sampling gate 16 which opens each time it is supplied with a short pulse from a differentiating circuit 17. The duration of each of these short pulses is less than half the duration of a field blanking pulse. As a result, the gate 16 produces a train of output pulses of equal duration and having amplitudes and polarities representative of the magnitude of the respective ramp at the time of sampling by a pulse from the differentiating circuit 17. As will be explained hereinafter, the pulses from the differentiating circuit 17 are produced at a rate which is substantially equal to the field frequency, so that each ramp from the ramp generator 15 is sampled once, by a respective pulse from the circuit 17, and the output pulses from the gate 16 indicate by the magnitude and polarity at what phase of the respective ramp they occurred. These output pulses are supplied to a filtering and buffer circuit 18 which produces as a result an analog voltage representative of the sampled phase of the ramps from the generator 15. This analog voltage is summed with another voltage at the summing junction 19 of two resistors 20 and 21 and the resultant summed voltage supplied to the input of the power amplifier 12.

The said other voltage is produced at the output terminal of an integrator 22 having the input terminal capacitively coupled, through a capacitor 23, to the output terminal of a monostable circuit 24. The input terminal of the monostable circuit 24 is connected to the output terminal of a differential amplifier 25 having one input terminal 26 connected to a phototransistor 27 and the other input terminal 28 coupled through a resistor 29 to the phototransistor 27, and to ground through a capacitor 30. The phototransistor 27 is arranged to receive light from a light source 31 through a peripheral region 32 of a transparent disc 33, the tachometer disc of FIG. 1 mounted coaxially on the output shaft 13 of the motor 11. The peripheral region 32 of the disc 33 is divided into 72 equal transparent segments by 72 equal black segments so that when the motor is running the light travelling from the source 31 to the photo-transistor 27 is interrupted 72 times in each revolution of the disc 32. Thus in operation the phototransistor 27 generates 72 pulses per revolution of the motor shaft 13. The capacitor 30 charges to the mean or d.c. level of the pulse train applied to the terminal 26, and the voltage at the terminal 26 steps alternately above and below the voltage at the terminal 28. The differential amplifier 25 therefore produces at its output terminal a train of pulses having zero volts as the mean level but identical to the train produced by the phototransistor 27 as regards frequency and pulse width. One edge of each pulse from the amplifier 25 triggers the monostable circuit 24. The resultant pulses from the monostable circuit 24 are capacitively coupled to the integrator circuit 22 which produces an output voltage level which is dependent upon the frequency of the pulses from the monostable circuit 24 i.e. the rate of rotation of the motor shaft 13, and the time constant of the monostable circuit 24, which is adjustable. This output voltage level is summed with the analog voltage from the filtering and buffer circuit 18 as described hereinbefore.

The power amplifier 12 is such that if the voltage at the summing point 19 is zero the output from the amplifier 12 is at a maximum and the motor 11 accelerates towards its maximum speed. As the motor 11 runs faster, so the frequency of the pulses generated by the ohototransistor 27 increases and the voltage at the summing point 19 increases. It is arranged that the output of the amplifier 12 decreases as the voltage at the summing point 19 increases. Thus the rate of operation of the motor 11 tends towards a predetermined reference rate, determined by the time constant of the monostable circuit 24, at which the voltage at the point 19 is just sufficient to stop the motor from accelerating. This rate is such that the intermittent drive mechanism is operated substantially at the desired number of frames per second.

The rate of rotation of the shaft 13 is brought into and held in the desired precise relationship with the field frequency by the analog voltage supplied to the resistor 20 by the filtering and buffer circuit 18.

The short pulses generated by the differentiating circuit 17 are obtained by differentiation of longer pulses supplied to the circuit 17 by a monostable circuit 34 which is triggered by output pulses from a divider circuit 35. The divider circuit 35 receives at its input terminal pulses from a divide-by-twelve circuit 36 having its input terminal connected to the output terminal of the monostable circuit 24. The divider circuit 35 can be set, by operation of a switch not shown, to divide either by three or by two. Thus, since the phototransistor 27 produces seventy-two pulses for each revolution of the shaft 13, the input of the monostable circuit 34 is supplied either with two or with three pulses for each revolution of the shaft 13, depending upon the setting of the divider circuit 35. Only one edge of each output pulse from the monostable circuit 34 is utilised at the sampling gate 16.

For television in the United Kingdom, the standard field frequency is 50 Hertz. Standard film transport rates are eighteen frames per second and twenty-four frames per second. For television pruposes, these rates are altered to 16⅔ frames per second and 25 frames per second respectively so that for the former rate each frame is scanned three times and for the latter rate each frame is scanned twice. In the flying spot scanner incorporating the apparatus shown in FIG. 1, one revolution of the disc 33 corresponds to one frame of a film, the shaft 13 being in practice a step down gear unit coupling the motor 11 to the disc 33. If a film to be scanned is intended to be shown at 18 frames per second, the motor 11, which drives a claw mechanism (not shown) for holding and transporting each frame of the film through an optical gate (not shown), is driven by the amplifier 12 at a rate which results in the intermittent drive mechanism operating at 16⅔ frames per second. This is achieved by setting the divider circuit 35 to divide by two so that the differentiating circuit 17 produces three pulses for each revolution of the disc 33. The speed of the motor 11 then changes until each of the pulses coincides with a predetermined reference point in a respective ramp generated by the ramp generator 15. Thus there is one frame for each group of three fields, and there are 16⅔ frames per second. If the film to be scanned is intended to be shown at twenty-four frames per second, the motor 11 is driven by the amplifier 12 at a rate which results in the intermittent drive mechanism operating at 25 frames per second. This is achieved by setting the divider circuit 35 to divide by three so that the differentiating circuit 17 produces two pulses for each revolution of the disc 33. The speed of the motor 11 then changes until each of the pulses coincides with the predetermined reference point in the respective ramp. Thus there are 25 frames per second.

To ensure that pulses generated by the differentiating circuit 17 are produced at times which will ensure that each claw action of the intermittent drive mechanism pulling the film through the film gate occurs during a field blanking pulse, i.e. during the field flyback time, resetting pulses are supplied to the divide-by-12 circuit 36 and the divider circuit 35 once in each revolution of the disc 33. Thus the occurrence of each group of two or three pulses produced by the differentiating circuit 17 during one revolution of the disc 33 is placed in a predetermined relationship to the said claw action which results in desired coincidence of a field blanking pulse with the claw action.

The resetting pulses are generated by a phototransistor 37 and shaped by a differential amplifier 38 and a one-shot circuit 39. The two input terminals of the differential amplifier 38 are coupled together by a resistor 40 and coupled to ground by a capacitor 41. The resistor 40 and the capacitor 41 serve for the differential amplifier 38 the same function as do the resistor 29 and the capacitor 30 for the differential amplifier 25.

The phototransistor 37 generates one pulse per revolution of the disc 33 in response to the interruption of a light travelling to the phototransistor 37 from a source of light 42 through a region of the disc 33 which is closer to the axis of the disc 33 than is the region 32 and includes one black area 43.

Figure 2:
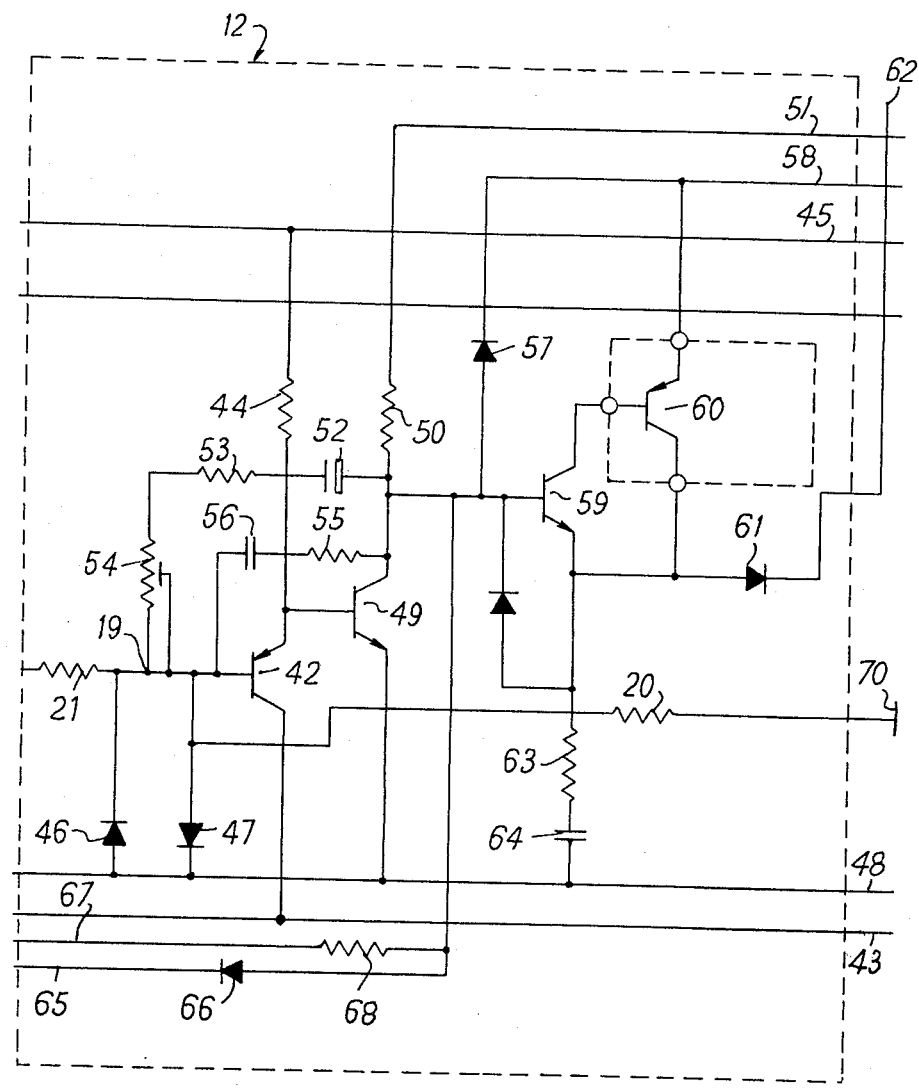
FIGS. 2 to 6 are circuit diagrams of parts of the control apparatus of FIG. 1.

FIG. 2 shows the circuit of the amplifier 12, the summing resistors 20 and 21, and the summing point 19. The summing point 19 is connected to the base of an PNP transistor 42 having its collector connected to a supply rail 43 supplied with −12 volts, and its emitter coupled through a resistor 44 to a supply rail 45 supplied with +12 volts. Two diodes 46 and 47 couple the point 19 to a ground rail 48 at zero volts. The diodes 46 and 47 are oppositely poled and serve to limit the voltage excursions at the base of the transistor 42 to −0.6 volts and +0.6 volts respectively. The transistor 42 is connected as an emitter follower, its emitter being connected to the base of an NPN transistor 49 having its emitter connected to the ground rail 48 and its collector coupled through a load resistor 50 to a supply rail 51 supplied with +50 volts. Two negative feedback couplings are provided between the collector of the transistor 49 and the base of the transistor 42. One of these couplings consists of a electrolytic capacitor 52 in series with a fixed resistor 53 and an adjustable resistor 54, and the other coupling consists of a fixed resistor 55 in series with a capacitor 56. The two negative feedback couplings serve to prevent substantially any rapid changes in the signal supplied to the amplifier 12 from being transmitted by the amplifier 12.

When the rotor of the motor 11 is not rotating, the voltage at the point 19 is set at +0.6 volts, and the voltage at the collector of the transistor 49 is set at a little above +24 volts by a diode 57 having its anode connected to the collector of the transistor 49 and its cathode connected to a supply rail 58 supplied with +24 volts.

The collector of the transistor 49 is connected to the base of an NPN transistor 59 having its collector connected to the base of a PNP transistor 60, and its emitter connected to the collector of the transistor 60. The emitter of the transistor 60 is connected to the rail 58. The collector of the transistor 60 and the emitter of the transistor 59 are coupled through a diode 61 to an output terminal 62 which constitutes one power input terminal of the motor 11, and through a series combination of a resistor 63 and a capacitor 64 to the ground rail 48. The capacitor 64 and the resistor 63 suppress transients caused by the motor at the terminal 62. A diode which has its anode connected to the emitter of the transistor 59 and its cathode connected to the base of the transistor 59, is provided to protect the base-emitter junction of the transistor 59.

When the voltage at the point 19 is +0.6 volts, the voltage at the base of the transistor 59 is at the reference level provided by the diode 57 and a maximum current is supplied through the diode 61 to the motor 11. The motor 11 can be stopped by the application of a negative level to a stop input terminal 65 coupled to the base of the transistor 59 through a clamping diode 66. The motor 11 can also be set at a slow rate by connecting a slow input terminal 67 to ground. The terminal 67 is coupled to the base of the transistor 59 through a resistor 68.

Figure 3:
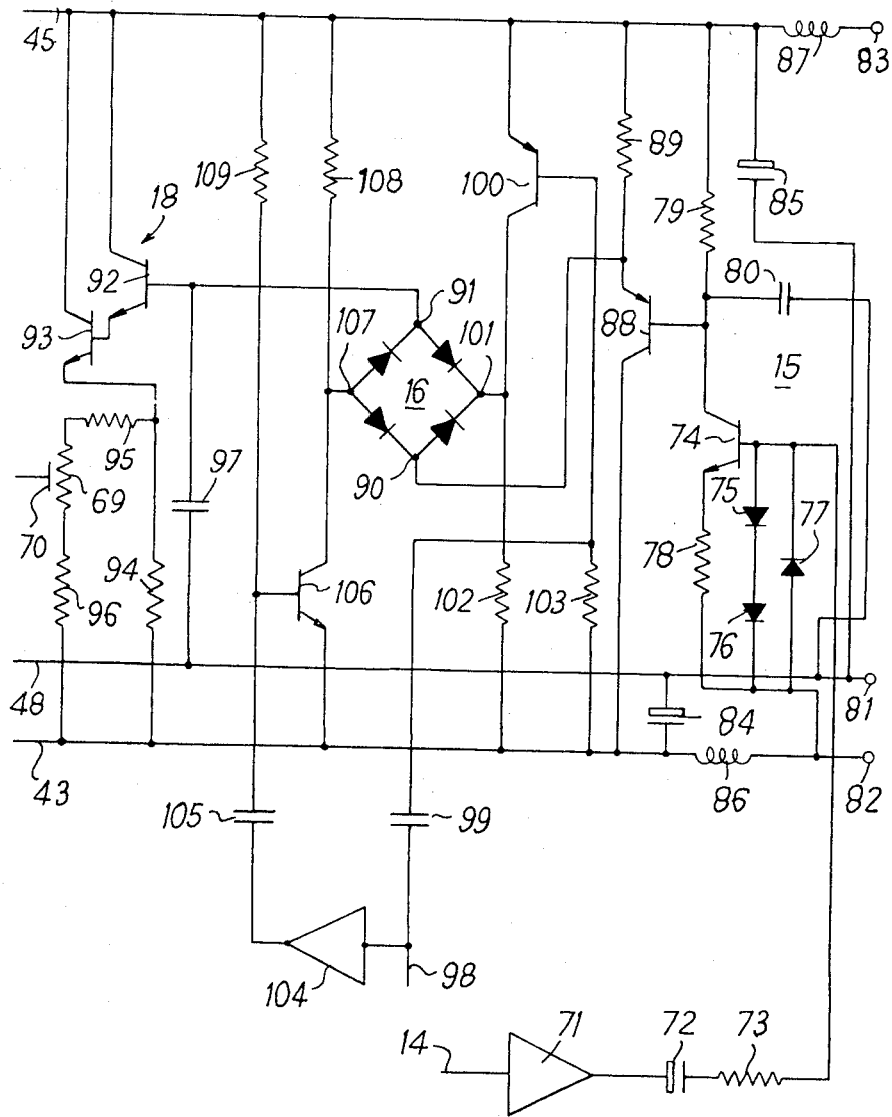

FIG. 3 shows the input terminal 14 to which field blanking pulses are supplied, the ramp generator 15, the sampling gate 16, and the filtering and buffer circuit 18. The circuit 18 includes a potentiometer-resistor 69 having a sliding contact 70 which is connected to the resistor 20 of FIGS. 1 and 2.

In operation, the field blanking pulses are supplied by the synchronizing generator to the terminal 14 which is the input terminal of an inverter 71. The inverted pulses are a.c. coupled through an electrolytic capacitor 72 and a series resistor 73 to the base of an NPN transistor 74. The base of the transistor 74 is coupled to the terminal 82 by two series diodes 75 and 76 and an oppositely poled parallel diode 77 which clip the pulses supplied through the resistor 73. The emitter of the transistor 74 is coupled to the terminal 82 through a resistor 78, and its collector is coupled to the +12 volts supply rail 45 through a resistor 79. The transistor 74 is operated as a switchable constant current source by the pulses supplied to its base. An integrating capacitor 80 is connected between the collector of the transistor 74 and the ground rail 48.

Supply input terminals 81, 82 and 83, and decoupling capacitors 84 and 85, and decoupling chokes 86 and 87 are provided as shown for the supply and ground rails 43, 45 and 48.

When the transistor 74 is off, i.e. not conducting, the capacitor 80 charges through the resistor 79. When the transistor 74 is on, i.e. conducting, the capacitor 80 discharges through the transistor 74 and the resistor 78. The charging time is very much longer than the discharging time, so that a positive going ramp voltage is generated at the collector of the transistor 74. This collector is connected to the base of a PNP emitter follower transistor 88 having an emitter resistor 89 connected to the supply rail 45 and its collector connected to the supply rail 43. The emitter of the transistor 88 is connected to one corner 90 of a diode bridge which constitutes the sampling switch 16. The opposite corner 91 of the bridge 16 is connected to the base of a NPN transmistor 92 of a double emitter follower circuit in which the emitter of the transistor 92 is connected to the base of a further NPN transistor 93 of which the emitter is coupled to the supply rail 43 through a resistor 94 in parallel with a series combination of a resistor 95, the potentiometer-resistor 69, and a resistor 96. The collectors of the transistors 92 and 93 are connected to the supply rail 45. The base of the transistor 92 is coupled to the ground rail 48 through a capacitor 97. The double emitter circuit and the capacitor 97 serve as the buffering and filtering circuit 18 which smooths and buffers the output from the gate 16 to the summing resistor 20.

The short pulses supplied by the differentiating circuit 17 in operation to the gate 16 reach the gate 16 by two paths from a terminal 98. One path consists of a series coupling capacitor 99 and a PNP transistor 100 having its collector connected to a third corner 101 of the gate 16 and coupled through a resistor 102 to the supply rail 43, its emitter connected to the supply rail 45, and its base connected to the capacitor 99 and coupled through a resistor 103 to the supply rail 43. The said short pulses are therefore a.c. coupled with amplification by the transistor 100 to the carrier 101 of the gate 16. The other path consists of an inverter 104, a series coupling capacitor 105, and an NPN transistor 106 having its emitter connected to the supply rail 43, its collector connected to the remaining corner 107 of the gate 16 and coupled through a resistor 108 to the supply rail 45, and its base connected to the capacitor 105 and coupled through a resistor 109 to the supply rail 45. Thus in operation the said short pulses are applied differentially to the pair of opposite corners 101 and 107.

Figure 4:
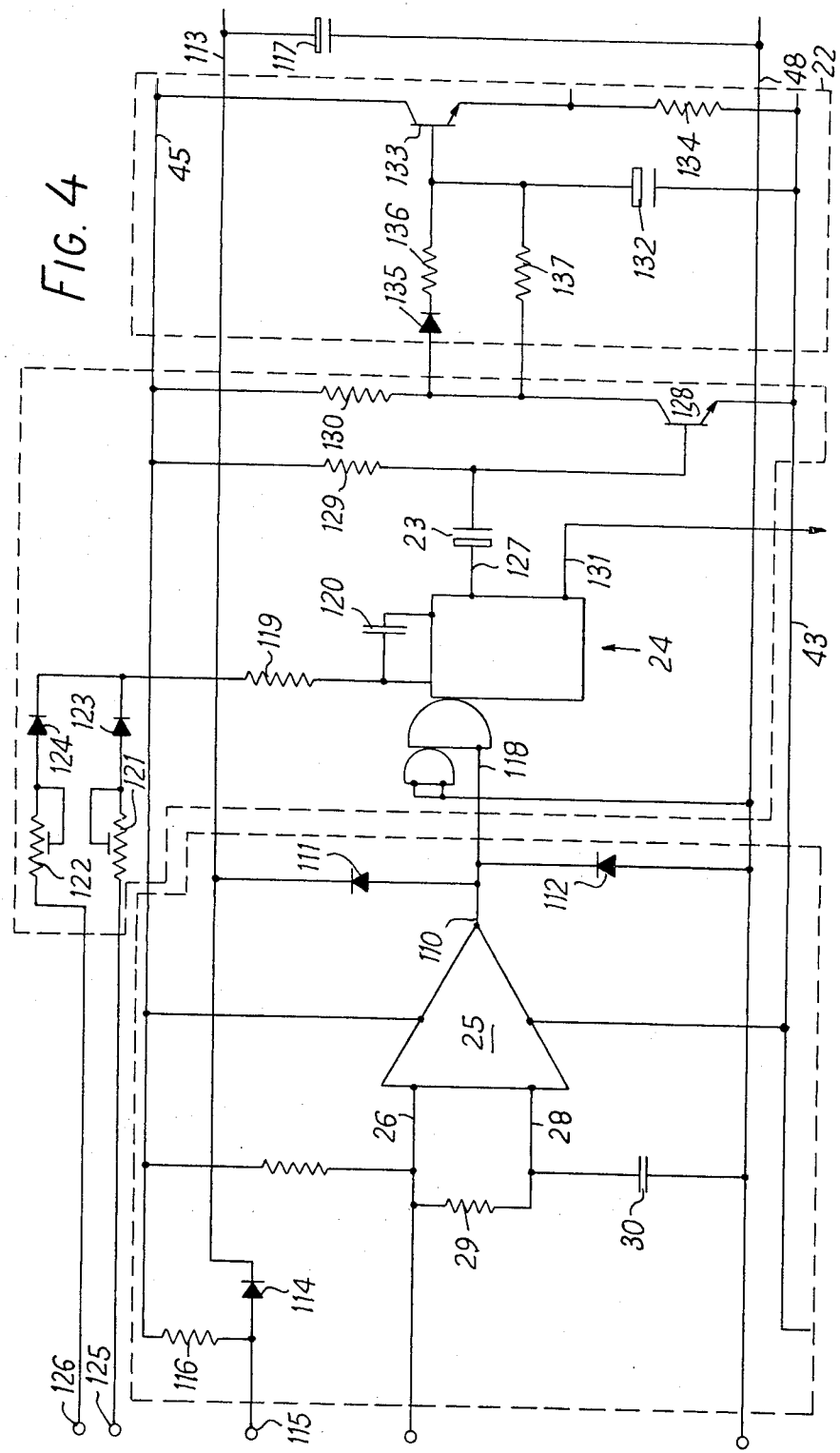

FIG. 4 shows that the amplifier 25 is supplied from the supply rails 43 and 45 and has an output terminal 110 connected to the anode of a clamping diode 111 and to the cathode of a clamping diode 112, the cathode of the diode 111 being connected to a supply rail 113 supplied with +5 volts in operation, and the anode of the diode 112 being connected to the ground rail 48. The supply rail 113 is connected to the cathode of a temperature compensation diode 114 having its anode connected to a reference terminal 115 to which a voltage of 5.66 volts is supplied in operation. A temperature compensation resistor 116 couples the supply rail 45 to the terminal 115. An electrolytic decoupling capacitor 117 is connected between the supply rail 113 and the ground rail 48.

Output pulses from the amplifier 25 are confined between the limits imposed by the clamping diodes 111 and 112 and are supplied to a triggering input terminal 118 of the monostable circuit 24. The time constant of the monostable circuit 24 is adjustable and is determined by a fixed resistor 119, and capacitor 120, and two adjustable resistors 121 and 122 coupled respectively through diodes 123 and 124 to the resistor 119.

If a film to be scanned is intended to be shown at 18 frames per second the resistor 121, suitable adjusted, is brought into use by connecting it to the 5.6 volt supply through a terminal 125, the resistor 122 being left floating. If the intended rate is 24 frames per second, the resistor 122, suitable adjusted, is brought into use by connecting it to the 5.6 volt supply through a terminal 126, the resistor 121 being left floating.

The monostable circuit 24 has two further input terminals both of which are connected to the ground rail 48. One output terminal 127 of the circuit 24 is coupled through the capacitor 23 the base of an NPN transistor 128 having base and collector resistors 129 and 130 connected to the supply rail 45, and having its emitter connected to the supply rail 43. Another output terminal 131 of the monostable circuit 24 is connected to the divide-by-twelve circuit 36. Output pulses produced by the circuit 24 are a.c. coupled through the capacitor 23 and serve to switch off intermittently the transistor 128, which is normally conducting.

The integrator circuit 22 has an integrating electrolytic capacitor 132 connected between the supply rail 43 and the base of an NPN transistor 133 which is connected as an emitter follower, its collector being connected to the supply rail 45, and its emitter being coupled through a resistor 134 to the supply rail 43. The capacitor 132 is alternately charged through a diode 135 and a resistor 136 connected in series between the collector of the transistor 128 and the capacitor 132, and discharged through a resistor 137 and the transistor 128 which are connected in series across the capacitor 132, the base current of the transistor 133 being negligible. Thus the capacitor 132 in operation reaches a voltage which depends upon the rate and mark/space ratio of the switching of the transistor 128. The mark/space ratio is set by the resistor 119, the capacitor 120, and whichever of the resistors 121 and 122 is used. Hence the voltage at the emitter of the transistor 133 varies only with the rate of rotation of the rotor of the motor 11 in operation. The emitter of the transistor 133 is connected to one end of the summing resistor 21.

Figure 5:
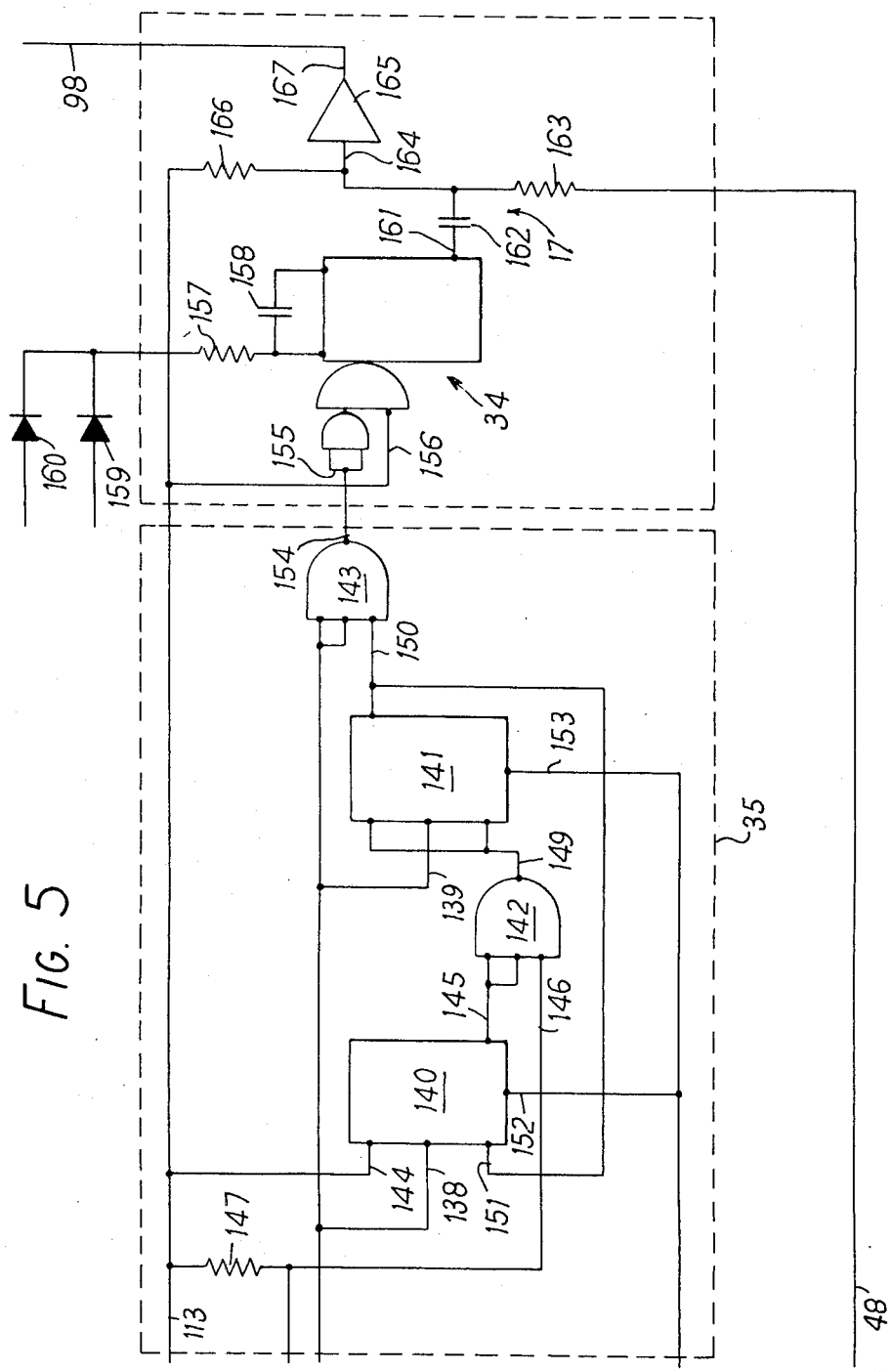

The output pulses at the terminal 131 of the monostable circuit 24 are supplied to the divide-by-12 circuit 36 (FIG. 6) and the resultant pulses therefrom supplied to respective clock input terminals 138 and 139 of two J-K bistable circuits 140 and 141 interconnected with two AND-gates 142 and 143 to form the divider circuit 35, as shown in FIG. 5. The supply rail 113 is connected to the J-input terminal 144 of the circuit 140. The $\overline{Q}$-output terminal 145 of the circuit 140 is connected to two input terminals of the gate 142, a third input terminal 146 of which is connected to a source of zero volts or +5 volts according to whether the film to be scanned should be shown at 18 or 24 frames per second. A resistor 147 connects the terminal 146 to the supply rail 113. The output terminal 149 of the gate 142 is connected to the J- and K-input terminals of the circuit 141. The Q-output terminal 150 of the circuit 141 is connected to the K-input terminal 141 of the circuit 140 and to one input terminal of the gate 143, the other two input terminals of which are connected to receive the output of the divide-by-12 circuit 36. The circuits 140 and 141 have re-setting input terminals 152 and 153 which are connected to receive the output of the circuit 39. If the circuit 35 is to divide by two, the gate 142 is inhibited and and only the circuit 141 operates, thereby dividing by two. The gate 143 merely serves as a coincidence gate and gates the output of the circuit 141 with the output of the divide-by-12 circuit 36. The output terminal 154 of the gate 143 serves as the output terminal of the circuit 35. If the circuit 35 is to divide by three, the gate 142 is open and couples the terminal 145 to the circuit 141. It can be shown that the coupling of the circuits 140 and 141 results in division by three by the circuit 35.

The output terminal 154 of the circuit 35 is connected to triggering input terminals 155 of the monostable circuit 34. A further input terminal 156 of the circuit 34 is connected to the supply rail 113. The circuit 34 has its time constant determined by a resistor 157 and a capacitor 158. The resistor 157 is connected to the cathodes of two diodes 159 and 160. The anodes of the diodes 159 and 160 can be connected to respective sources of reference voltage. Only one of the diodes 159 and 160 is rendered conductive, which one depending upon whether the film to be scanned is an 18 frames per second or 24 frames per second film. The respective sources of reference voltage determine the mark/space ratio of the circuit 34 and hence the timing of the resetting edge of each pulse produced by the circuit 34. An output terminal 161 is connected to the differentiating circuit 17 which has a capacitor 162 and a resistor 163. One end of the resistor 163 is connected to the ground rail 48, and the other end is connected to the capacitor 162 and to an input terminal 164 of an inverter 165 and one end of a resistor 166 having its other end connected to the supply rail 113. The output terminal 167 of the inverter 165 is connected to the terminal 98 shown in FIG. 3. The resistors 163 and 166 and the capacitor 162 have ratings such that only the resetting edge of each pulse produced by the monostable circuit 34 produces a pulse at the output terminal 167.

Figure 6:
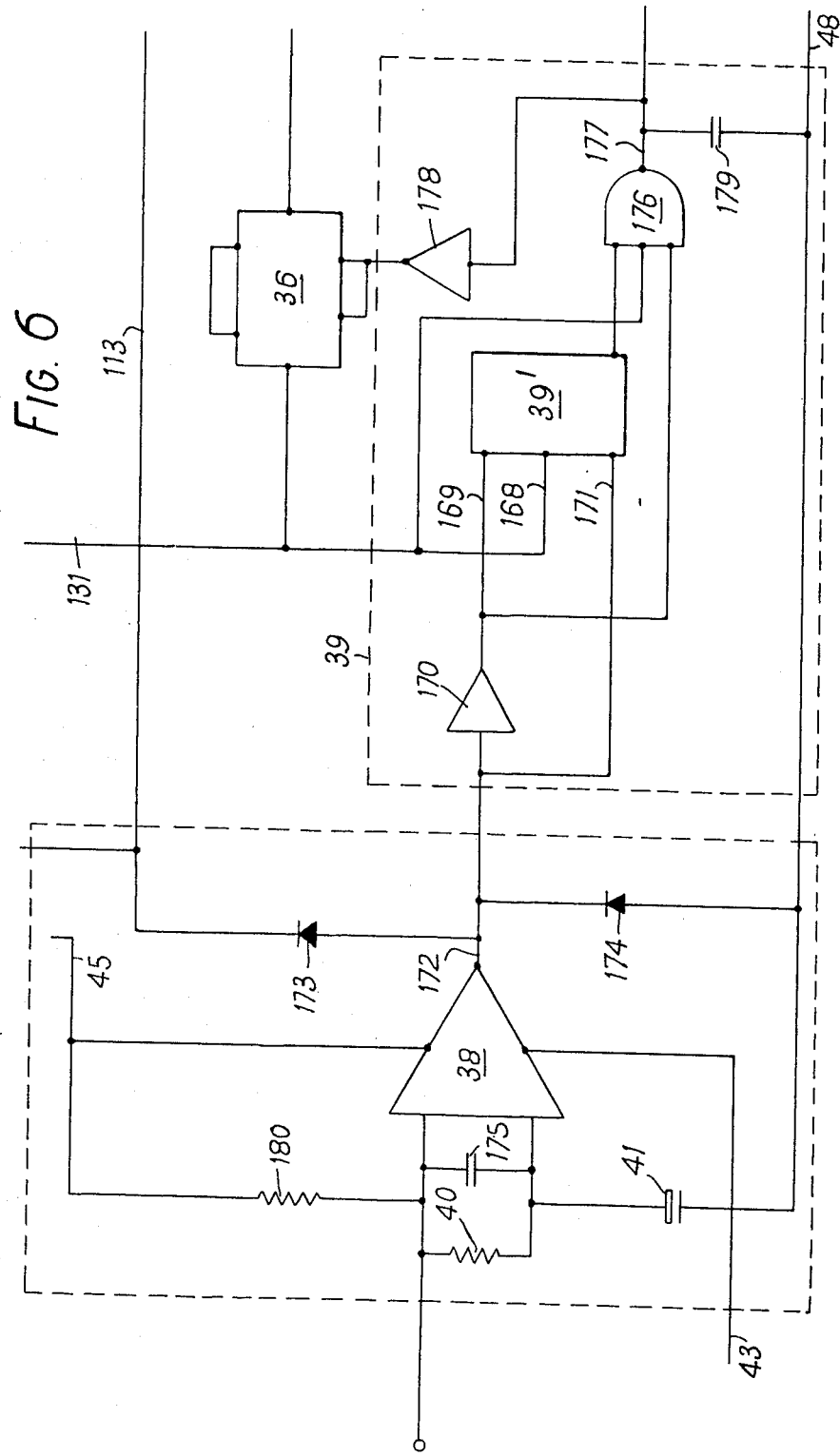

The resetting pulses applied to the terminals 152 and 153 in the circuit 35 are provided by the one-shot circuit 39 which as shown in FIG. 6, consists of an inverter 170, a J-K bistable circuit 39' having its clock input terminal 168 connected to the output terminal 131 of the monostable circuit 24, its J-input terminal 169 connected to the output terminal of the inverter 170, and its K-input terminal 171 connected to the input terminal of the inventer 170, an AND gate 176, and an inverter 178.

The input terminal of the inverter 170 and the terminal 171 are connected to an output terminal 172 of the differential amplifier 38, the output of which is limited by two clamping diodes 173 and 174 coupling the terminal 172 respectively to the rails 113 and 48. The input terminals of the amplifier 38 are coupled by a capacitor 175 which acts as a low pass filter restricting the pass band of the amplifier 38.

The AND gate 176 gates the $\overline{Q}$ output of the bistable circuit 39 with the pulses at the terminal 131 and the pulses at the output terminal of the inverter 170. The output at the output terminal 177 of the gate 176 is a train of pulses corresponding to a selection from the train of pulses at the terminal 131 of those pulses corresponding to one mark on the peripheral region 32 of the disc 33. These pulses are supplied as resetting pulses for the circuit 35 at the terminals 152 and 153, to which the terminal 177 is connected, and, after inversion by the inverter 178, to the divide-by-twelve circuit 37. Unwanted transients at the terminal 177 are coupled to the ground rail 48 through a capacitor 179. Power is supplied to the amplifier 38 from the rails 43 and 45, and means voltage levels are set at the input terminals of the amplifier 38 by the coupling of the capacitor 175 through a resistor 180 to the supply rail 45 and through the capacitor 41 to the ground rail 48.

The way in which the one-shot circuit 39 operates is as follows.

A clock pulse is supplied to the terminal 168 of the circuit 39' and to the gate 176 during each mark in the region 32 of the disc 33. The output at the $\overline{Q}$ terminal of the circuit 39' changes to or remains at the same logic level at the input as the K-input terminal 171 at the occurrence of the trailing edge of each clock pulse at the terminal 168.

When the mark 43 on the disc 33 is not interrupting the light from the source 42, the logic level at the output terminal 172 of the amplifier 38 is 1, so that the logic levels at the input terminal 169, the input terminal of the gate 176 connected thereto, and the input terminal 171 are 0,0 and 1 respectively. Consequently the gate 176 is inhibited by the 0 level at the output of the inverter 170 and no pulses appear at the output terminal 177. The $\overline{Q}$ output terminal is at the level 1 as a result of changing to and remaining at the level at the K-input terminal 171.

When the mark 43 interrupts the light from the source 42 a logic level 0 appears at the ouput terminal 172, so that the levels at the input terminal 169, the input terminal of the gate 176 connected thereto, and the input terminal 171 are 1,1 and 0 respectively. The level at the $\overline{Q}$ input terminal of the circuit 39' remains at the level 1 until the trailing edge of the first clock pulse received under these conditions has occurred. Consequently, during this first clock pulse, the AND-gate 176 receives a first input in the form of the clock pulse at a level 1, a second input at level 1 from the output terminal of the inverter 170, and a third input at level 1 from the $\overline{Q}$ output terminal of the circuit 39', and therefore the gate 176 produces at the output terminal a single output pulse which is synchronous with the said first clock pulse. When the trailing edge of this clock pulse occurs, the $\overline{Q}$ output terminal changes to the 0 level at the K-input terminal 171, so that the gate 176 is inhibited and produces no further output pulses until the $\overline{Q}$ output terminal has been changed to the 1 level again by the passage of the mark 43 from the path of the light from the source 42, and the mark has rotated again into the path of the light from the source 42 thereby changing the level at the output terminal 172 to 0 while the $\overline{Q}$ output of the circuit 39' is 1. Thus the one shot circuit 39 produces only one pulse during each rotation of the disc 33, and this single pulse corresponds to, and is in effect, the pulse generated by the first of the 72 marks in the region 32 corresponding to the mark 43. This makes it possible for the mark 43 to be of greater angular extent about the centre of the disc 33 than a single one of the marks in the region 32, and so the difficulty of attempting to confine the mark 43 to the same angle and position as a single one of the marks in the region 32 is avoided.

In the United States the standard film transport rates are also eighteen frames per second and twenty-four frames per second. However, for television in the United States, the standard field frequency is 60 Hertz. Consequently the standard film rates must be altered. This can be done without losing the illusion of natural movement by running 18-frame per second film at 17 1/7 frames per second, and 24 frame per second film at 24 frames per second.

To accommodate 18-frame per second film where the television transmitter apparatus of FIG. 7 is in accordance with U.S. television standards, the motor 11 drives the shaft 13 of FIG. 1 at 8 4/7 rotations per second, and the intermittent drive mechanism in accordance with the aforementioned co-pending application by Taylor, Halliday, Angel and Blakemore carries out two claw actions per rotation of the shaft 13, the angular separations of these two actions being 3/7 of a rotation of the shaft 13 followed by 4/7 of the rotation, so that their separation in time is 3/60 seconds followed by 4/60 seconds, i.e. three fields followed by four fields.

For 24-frame per second film, the shaft 13 is driven at 12 rotations per second, and the intermittent drive mechanism carries out two claw actions per rotation of the shaft 13, the angular separations of these two actions being 2/5 followed by 3/5 of a rotation of the shaft 13, so that in time the separations are 2/60 seconds followed by 3/60 seconds, i.e. two fields followed by three fields. To adapt the motor control circuits of FIG. 1 to these circumstances, the tachometer disc 33 can be provided at its outer periphery 32 with seventy equal black segments separated by seventy equal transparent segments, the circuit 36 can be a divide-by-2 circuit, and the circuit 35 can be a divider circuit which can be adjusted to divide by either five or seven, the monostable circuit 24 having an adjustable time constant settable at either of two values suitable for driving the motor 11 at the nominal required rate. When the circuit 35 divides by 5, the motor 11 will be controlled for nominal 18-frame per second film, and when the circuit 35 divides by 7, the motor 11 will be controlled for 24-frame per second film.

We claim:

1. Control apparatus for an electric motor having a rotor arranged to provide an intermittent drive, said control apparatus comprising
   tachometric generator means for sensing the rate of rotation of said rotor and generating an analog signal representative of said rate;
   power amplifier means coupled to energise said motor;
   feedback coupling means coupling said tachometer generator means to said amplifier means and adapted to cause said amplifier means to energise said motor to drive said rotor at a predetermined rate of rotation, said tachometer generator means including angular position sensing means adapted to provide a tachometric periodic signal having a frequency proportional to the rate of rotation of the rotor and including an indication of the intermittent movement provided by said intermittent drive means;
   comparator means coupled to supply said coupling means;
   timing means;

reference periodic signal input means in said comparator means coupled to said timing means to receive timing pulses therefrom;

tachometric signal input means in said comparator means coupled to receive said tachometric periodic signal, said comparator means thereby comparing said tachometric periodic signal with said timing pulses and generating a further input signal to said coupling means thereby to control said motor to synchronise said intermittent movement with a timing pulse; and frequency divider means in said tachometer generator means, said frequency divider means being selectively adaptable to divide by either one of two possible divisors whereby said frequency of said tachometric periodic signal is selectable as one of two possible values.

2. Control apparatus as claimed in claim 1, wherein said frequency divider means comprises pulse divider means, said tachometer generator means including pulse generator means driven by said motor, and said pulse divider means being coupled between said pulse generator means and said comparator means.

3. Control apparatus according to claim 1, wherein said comparator means comprises ramp generator means arranged to generate one ramp in each cycle of said reference periodic cycle and to sample each ramp at a phase corresponding to a selected phase of said tachometric periodic signal.

* * * * *